(12) United States Patent
Lawler, Jr.

(10) Patent No.: US 10,215,644 B2
(45) Date of Patent: Feb. 26, 2019

(54) ENVIRONMENTAL AND PRODUCT SENSING

(71) Applicant: PAKSENSE, INC., Boise, ID (US)

(72) Inventor: Casimir E. Lawler, Jr., Boise, ID (US)

(73) Assignee: PAKSENSE, INC., Boise, ID (US)

( * ) Notice: Subject to any disclaimer, the term of this patent is extended or adjusted under 35 U.S.C. 154(b) by 0 days.

(21) Appl. No.: 15/790,757

(22) Filed: Oct. 23, 2017

(65) Prior Publication Data

US 2018/0058940 A1 Mar. 1, 2018

Related U.S. Application Data

(63) Continuation of application No. PCT/US2016/029041, filed on Apr. 22, 2016.

(60) Provisional application No. 62/151,185, filed on Apr. 22, 2015.

(51) Int. Cl.
| | |
|---|---|
| *G01K 1/02* | (2006.01) |
| *G01K 3/04* | (2006.01) |
| *G06F 17/30* | (2006.01) |
| *G06Q 40/08* | (2012.01) |

(52) U.S. Cl.
CPC ............... *G01K 1/024* (2013.01); *G01K 3/04* (2013.01); *G06F 17/30* (2013.01); *G06Q 40/08* (2013.01)

(58) Field of Classification Search
CPC .................................. G01K 1/024; G01K 3/04
See application file for complete search history.

(56) References Cited

U.S. PATENT DOCUMENTS

| | | | |
|---|---|---|---|
| 4,028,944 | A | 6/1977 | Erb |
| 7,675,409 | B2 | 3/2010 | Jensen et al. |
| 2008/0012579 | A1 | 1/2008 | Kuhns et al. |
| 2010/0245112 | A1 | 9/2010 | Ludwig et al. |
| 2010/0296545 | A1 | 11/2010 | Haarer et al. |

OTHER PUBLICATIONS

International Preliminary Report on Patentability and Written Opinion of the International Searching Authority regarding PCT/US206/029041, dated Oct. 24, 2017.
Written Opinion of the International Searching Authority regarding International Application No. PCT/US2016/029041, dated Sep. 19, 2016.
International Search Report regarding International Application No. PCT/US2016/029041, dated Sep. 19, 2016.
Office Action regarding European Patent Application 16719736.9, dated Mar. 16, 2018.
Office Action regarding Canadian Patent Application No. 2,983,230, dated Jul. 19, 2018.

*Primary Examiner* — Leon Flores
(74) *Attorney, Agent, or Firm* — Harness, Dickey & Pierce, P.L.C.

(57) ABSTRACT

An electronic indicator includes a circuit having an environmentally sensitive component having a sensing component treated with or containing a material so as to be sensitive to an environmental condition. The material can be a colloidal polymer that is reactive with an environment to cause a change in a characteristic of the environmentally sensitive component. The circuit is configured to detect the change and to communicate the change.

13 Claims, 9 Drawing Sheets

ENVIRONMENTAL AND PRODUCT SENSING

CROSS-REFERENCE TO RELATED APPLICATIONS

This application is a continuation of International Application Number PCT/US2016/029041, filed on Apr. 22, 2016 and published as International Publication Number WO 2016/172626, which claims priority to U.S. Provisional Application 62/151,185, filed Apr. 22, 2015. This application also claims priority to U.S. Provisional Application 62/151,185, filed Apr. 22, 2015. The entire disclosures of each of the above applications are incorporated herein by reference.

FIELD

The present disclosure relates to environmental and product sensing and, more particularly, to an electronic indicator including a circuit having an environmentally sensitive component with a sensing component treated with or containing a material so as to be sensitive to an environmental condition.

BACKGROUND

Embodiments of the present disclosure relate generally to sensing environmental conditions and/or products and communicating the sensed information in order to inform users as to conditions that may exist that may affect items in the area and/or to inform a user of products that are present in the area.

Producers, distributors, warehousers, and quality personnel, among others, especially those in charge of perishable, spoilable, or high-value items that are, for example, moving through a logistics supply chain, may desire to know the condition of items for which their operation is accountable. Also, the customer perception of quality may be of value in some industries and, therefore, the monitoring of products through the supply chain may be used to indicate such quality to a customer base.

Further, some entities may be interested in lowering insurance premium costs and the monitoring of products through the supply chain may be one way to reduce such costs. Monitoring the environment of products as they travel is a way of gaining such efficiencies, increasing traceability, and/or of providing for the quality and safety of products which can influence one or more of the above factors, among other benefits.

In addition, producers, distributors, warehousers, and product sellers, among others, may desire to know what products they have in-stock and/or what products they may be running low and/or out of. Currently, such entities may use manual scanning systems and/or inventory systems that may depend on a user scanning information on the products (such as a barcode), to take inventory. However, a user may inaccurately collect the information and the manual scanning can result in increased human resources.

A number of environmental sensing assemblies have been taught, for example, in U.S. Pat. No. 7,057,495 "Perishable Product Electronic Label Including Time and Temperature Measurement" and U.S. Pat. No. 7,248,147 "Perishable Product Electronic Label Including Time and Temperature Measurement", and U.S. Pat. No. 7,675,409 "Environmental Sensing", all of which are commonly assigned and have at least one common inventor with the present application.

Some embodiments of the present disclosure may improve upon these and other devices, systems, and methods for environmental sensing and communication, in some instances.

SUMMARY

This section provides a general summary of the disclosure, and is not a comprehensive disclosure of its full scope or all of its features.

The present disclosure provides an electronic indicator including a circuit having an environmentally sensitive component having a sensing component treated with or containing a material so as to be sensitive to an environmental condition. The material is a colloidal polymer and is reactive with an environment to cause a change in a characteristic of the environmentally sensitive component. The circuit is configured to detect the change and to communicate the change.

In other features, the characteristic of the environmentally sensitive component includes at least one of a Q factor, an impedance, a resistance, a capacitance, an inductance, a capacitive leakage, and a power decay.

In other features, the material can include at least one of a carbon nanotube collection, a semiconducting ink, and an organic thin film.

In other features, the environmental condition can include at least one of a temperature, a humidity, and a presence of a chemical and the environmentally sensitive component includes at least one of an electrode, a resistor, and a transistor.

In other features, the environmentally sensitive component is coated with the material.

In other features, the environmentally sensitive component is doped with the material.

In other features, the electronic indicator further comprises a printed battery coupled to the circuit.

In other features, the electronic indicator further comprises an antenna coupled to the circuit wherein the antenna is configured to receive power from an external source to the electronic indicator via electromagnetic coupling.

In other features, the electronic indicator further comprises a printed battery configured to provide power to the circuit when the external source is not available.

In other features, the circuit is configured to communicate the change via the antenna to the external source.

The present disclosure includes another electronic indicator including a circuit having an environmentally sensitive component having a sensing component doped with a material so as to be sensitive to an environmental condition. The material is reactive with an environment to cause a change in a characteristic of the environmentally sensitive component. The circuit is configured to detect the change and to communicate the change.

In other features, the characteristic of the environmentally sensitive component includes at least one of a Q factor, an impedance, a resistance, a capacitance, an inductance, a capacitive leakage, and a power decay.

In other features, the material includes a colloidal polymer.

In other features, the material includes at least one of a carbon nanotube collection, a semiconducting ink, and an organic thin film.

In other features, the environmental condition includes at least one of a temperature, a humidity, and a presence of a chemical and the environmentally sensitive component includes at least one of an electrode, a resistor, and a transistor.

In other features, the electronic indicator further comprises a printed battery coupled to the circuit.

In other features, the electronic indicator further comprises an antenna coupled to the circuit wherein the antenna is configured to receive power from an external source to the electronic indicator via electromagnetic coupling.

In other features, the electronic indicator further comprises a printed battery configured to provide power to the circuit when the external source is not available.

In other features, the circuit is configured to communicate the change via the antenna to the external source.

In other features, the electronic indicator further comprises an antenna configured to receive power from an external source to the electronic indicator via electromagnetic radiation.

Further areas of applicability will become apparent from the description provided herein. The description and specific examples in this summary are intended for purposes of illustration only and are not intended to limit the scope of the present disclosure.

DETAILED DESCRIPTION

Figure 1A:
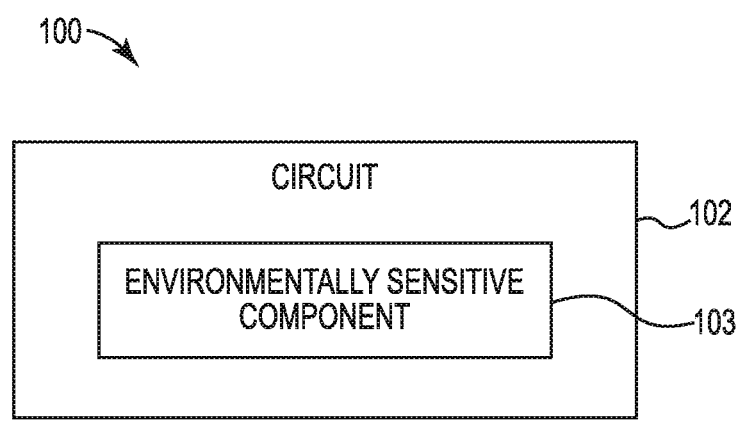
FIG. 1A is a block diagram of an environmental sensing assembly according to one or more embodiments of the present disclosure.

The present disclosure describes a number of device, system, and method embodiments. For example, some embodiments include an environmental sensing assembly, equipped to sense one or more changes in an environmental condition. The terms "environmental sensing assembly" and "electronic assembly" may be used interchangeably herein.

In some instances, an "environmental sensing assembly" or "electronic assembly" may be referred to as an "assembly" for sake of brevity. As used herein, "particular other" electronic assemblies can include those electronic assemblies within communication range of the wireless communicator for a particular time, as will be discussed in more detail below. In some embodiments, the wireless communicator can, for example, have a communication range less than 1000 feet. In some embodiments, the wireless communicator can, for example, have a communication range greater than 1000 feet. An example of a suitable wireless communicator can be a radio frequency (RF) transceiver, such as the CC1100 available from Texas Instruments, among other types of wireless communicators. An environmental condition can include temperature, humidity, physical orientation, proximity, acceleration, pressure, molecular compounds, chemical change and/or a presence of a chemical, shock, vibration, light, as well as other environmental data and combinations thereof. Accordingly, an environmental sensing assembly and/or environmental sensing system can include one or more sensors for one or more types of environmental data.

In various embodiments, the assembly includes a circuit coupled to memory that provides data storage. The circuit includes an environmentally sensitive component, such as an environmentally sensitive resistor, transistor, or electrode, configured to react to a change in an environmental condition. The circuit can detect the reaction of the environmentally sensitive component to the change in the environmental condition and communicate that information, for example, to memory (e.g., for storage), to another circuit, or to a user. Similarly, this environmentally sensitive component can affect the response to a stimulus applied to a sensing portion of the system.

At least one embodiment can include a labeled circuit assembly that includes a display coupled to the circuit. The display can be activated in response to a preset power source within the circuit reaching a threshold power level. For example, the display can be activated in response to a preset power source depleting.

Some embodiments according to the present disclosure include an environmental sensing system for a product. For example, the environmental sensing system can include a first circuit placed on a product and a second circuit placed in proximity to the product. The first circuit can include an environmentally sensitive component and the second circuit can periodically power the first circuit via electromagnetic coupling, such as electric, magnetic, inductive, capacitive, radio frequency, light, or other electromagnetic coupling between the first and second circuits. In some embodiments, the second circuit can output, using a sense amplifier, a difference between an input signal associated with powering the first circuit and a signal across a resistor in the second circuit and can identify the product or environmental condition based on the difference.

Further, some embodiments can include an environmental sensing system including a first circuit placed on a serving utensil or product container and a second circuit placed on an outer container or support housing. The first circuit can periodically measure a temperature and communicate the temperature to the second circuit. Similarly, the second circuit may interrogate the first circuit for information.

In some embodiments, the circuit can, for example, be configured to perform time measurement, perform environmental measurement with an environmental sensor, store time-stamped environmental data in the memory, and/or communicate with particular other electronic assemblies equipped to sense one or more changes in an environmental condition (e.g., via the wireless communicator). The circuit is also coupled to a power source that provides power to at least one of the circuit and a wireless communicator.

In some embodiments, the circuit can be configured to communicate time-stamped environmental data with the particular other electronic assemblies and/or to a remote reader device (e.g., via the wireless communicator). An electronic assembly can sense and/or store environmental data and/or communicate that data to other assemblies. Accordingly, in various embodiments, an environmental sensing assembly can receive environmental data transmitted by another assembly.

In some embodiments, the circuit can be configured to communicate environmental data with other electronic assemblies and/or to a remote reader device (e.g., via the wireless communicator) either on a regular interval or when polled. An electronic assembly can sense and/or communicate that data to other assemblies that may store and/or communicate that data along with additional data (e.g., a time-stamp or location-stamp). Accordingly, in various embodiments, a reading assembly can receive and/or retransmit environmental data and/or information transmitted by another assembly. In other embodiments, the circuit may gather energy from the environment or the electromagnetic interrogation of the reading assembly, providing the power to respond to the interrogating or other reader. In at least one embodiment, the circuit can be doped to cause a shift in the resonant frequency of the circuit proportional to the environmental condition to which the doped component is sensitive.

In at least one embodiment, an environmental sensing assembly is passive. It contains no internal independent power source, has no active memory, and has no active communications. Such an environmental sensing assembly only takes action when it scavenges energy from an external source (e.g., environmental or from another electronic assembly). Such an action can include responding with identification and an environmental condition (e.g., an indication of a change in an environmental condition). In some embodiments, another electronic assembly (e.g., a reader device) may write information back to passive memory associated with the passive environmental sensing assembly.

In some embodiments, after an environmental sensing assembly communicates data to a remote reader device and/or another circuit, the assembly and/or a circuit associated therewith can enter a sleep mode. In sleep mode, power can still be provided at a reduced setting, but instructions may not be executed and/or communications may not be transmitted via the wireless communicator, in order to preserve the life of a power source, among other benefits.

Figure 1B:
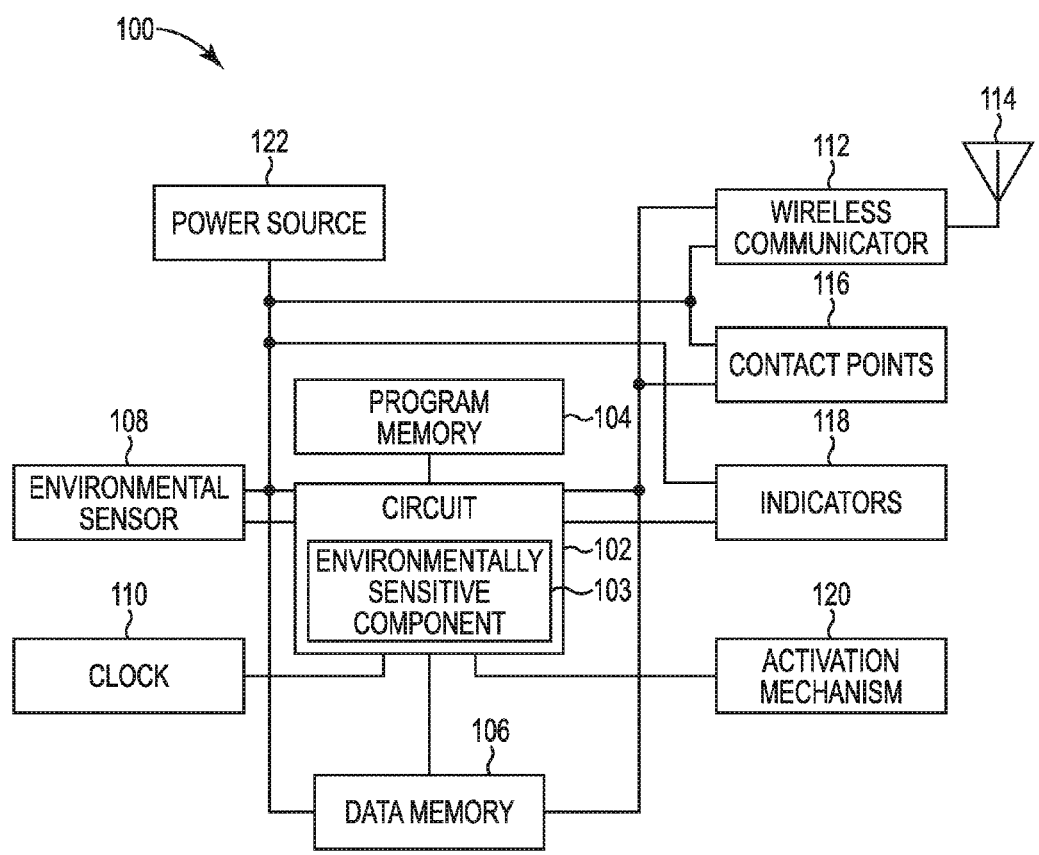
FIG. 1B is a block diagram of an environmental sensing assembly according to one or more embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 103 may reference element "03" in FIG. 1A, and a similar element may be referenced as 403 in FIG. 4A. Accordingly, teachings regarding element "03" with respect to embodiments associated with any of the figures herein, are equally applicable to embodiments associated with other figures. For example, teachings regarding the environmentally sensitive component 103 with respect to FIGS. 1A-1B are applicable to the environmentally sensitive component 403 and vice versa. As will be appreciated, elements shown in the various embodiments herein can be added, exchanged, and/or eliminated to provide a number of additional embodiments of the present disclosure. In addition, as will be appreciated the proportion and the relative scale of the elements provided in the figures are intended to illustrate the embodiments of the present disclosure, and should not be taken in a limiting sense.

FIG. 1A is a block diagram of an environmental sensing assembly 100 according to one or more embodiments of the present disclosure. Embodiments of the present disclosure can be utilized to provide a simple to use, low-cost, accurate, disposable, and/or re-usable device(s) as an element of a monitoring system. The environmental sensing assembly 100 can be, for example, a tag, label, or an assembly that is built into a package, among other suitable embodiments for monitoring environmental conditions. The environmental sensing assembly 100 can include a circuit 102, such as a passive circuit. The circuit 102 can include an environmentally sensitive component 103. The circuit 102 can detect the reaction of the environmentally sensitive component 103 to a change in an environmental condition. In various embodiments, the circuit 102 can function as one or more environmental sensors.

As used herein, an environmentally sensitive component is a component with added processing, such as material doping or coating as described in more detail herein. For example, the environmentally sensitive component can include an environmentally sensitive resistor, transistor, or electrode. The environmentally sensitive component 103 can react to a change in an environmental condition. The change in environmental condition can include a change in humidity, temperature, a temperate above or below a threshold temperature, a presence of a particular chemical and/or molecule, etc. For example, the environmentally sensitive component 103 can be coated in a material to create the environmentally sensitive component as with some surface acoustic wave (SAW) sensors. SAW sensors can modulate surface acoustic waves to sense a change in an environmental condition. The sensor can transduce an input electrical signal into a mechanical wave that can more easily be influenced by the environmental condition. The sensor can then transduce the wave back into an electrical signal. Changes in amplitude, phase, frequency, or time-delay, among others, between the input and output electrical signals can be used to measure the change in the environmental condition. Different materials can be used to cause different reactions to different environmental conditions.

In some embodiments, executable instructions can be provided that are executable by a reader device to cause the circuit 102 to take an environmental measurement at a predetermined time interval. In various embodiments, executable instructions can be provided that are executable by the reader device to take an average of a number of such environmental measurements. These averages can, for example, be calculated through use of a number of sets of environmental measurements. Such embodiments can be useful to help reduce power consumption by operation of one or more sensors and/or to help reduce consumption of available storage space in memory, among other benefits. The reader device can further process the data and/or communicate the data to remote storage (e.g., a cloud database).

In at least one embodiment, the circuit 102 can function as an electronic temperature and/or humidity monitor. The environmentally sensitive component 103 can be treated with or containing a material so as to be sensitive to an environmental condition such as a change in temperature and/or humidity, the presence of a chemical, etc. The material can be a functional material, such as a carbon nanotube collection, a semiconducting ink, and an organic thin film.

The material can be reactive with temperature and/or humidity to cause a change in a characteristic of the environmentally sensitive component 103. The circuit 102 can be configured to detect, or can be made sensitive to the change in the characteristic of the environmentally sensitive component 103. The circuit 102 can be configured to communicate the change in the temperature and/or humidity.

In at least one embodiment, the circuit 102 can be a printed circuit that functions as an electronic indicator. The electronic indicator can perform functions analogous to a chemical indicator as used in some previous approaches. An electronic indicator can be an inexpensive printed label applied to environmentally sensitive products such as vaccines or beer to provide an indication (e.g., by changing color). An electronic indicator may also be used to detect chemicals in the environment. The environmentally sensitive component 103 can be treated with a material so as to be sensitive to the presence of a chemical. The material can be reactive with the chemical to cause a change in at least one of a characteristic of the environmentally sensitive component 103. The circuit 102 can be configured to detect the change in the characteristic of the environmentally sensitive component 103. The circuit 102 can be configured to communicate the change in the presence of the detected chemical. The circuit 102 can be configured to communicate the change visually (e.g., by a portion of the circuit changing color or lighting up), wirelessly (e.g., via electromagnetic coupling with another circuit and/or device), etc.

The characteristic of the environmentally sensitive component 103 can be a Q factor, a resistance, a capacitance, an inductance, a capacitive leakage, and power decay. A Q factor is a dimensionless parameter that describes bandwidth relative to a center frequency, where higher Q indicates a lower rate of energy loss relative to stored energy (lower damping), and a lower Q indicates a higher rate of energy loss relative to stored energy (higher damping). The environmentally sensitive component 103 can be an oscillator, resonator, resistance-inductance-capacitance (RLC) circuit, resistor, capacitor, supercapacitor, inductor, electrode, transistor, or combinations thereof. In some embodiments, the environmentally sensitive component 103 can be included in the circuit 102 such that the change in the characteristic of the environmentally sensitive component 103 can change a characteristic and/or the overall behavior of the circuit 102.

The environmentally sensitive component 103 can be treated with the material by being coated with the material, doped with the material, etc. In at least one embodiment, the material can be a colloidal polymer. A particular colloidal polymer can be designed, chosen, and/or doped to be reactive to a particular chemical or environmental condition to be monitored. Increases or decreases in the presence of the chemical, or changes in the environmental condition, can cause different changes in a characteristic or temperature of the colloidal polymer, which can affect the electrical performance of the circuit 102. As described herein, the circuit 102 can detect the change, or has its behavior changed, and thereby gather information about the relative presence or absence of the chemical or the change in the environmental condition.

FIG. 1B is a block diagram of an environmental sensing assembly according to one or more embodiments of the present disclosure. The environmental sensing assembly 100 can be, for example, a reader device, a tag, label, or an assembly that is built into a package, among other suitable embodiments for monitoring environmental conditions.

The environmental sensing assembly 100 can include a circuit 102 such as a controller, a microprocessor, a microcontroller, an application specific integrated circuit (ASIC), or the like. The circuit 102 can include an environmentally sensitive component 103. The circuit 102 is analogous to the circuit 102 illustrated in FIG. 1A. The environmentally sensitive component 103 is analogous to the environmentally sensitive component 103 illustrated in FIG. 1A. In some embodiments, the circuit 102 may store an indication of the change in an environmental condition (e.g., as detected by the circuit 102 from the reaction of the environmentally sensitive component 103) in the memory, such as the data memory 106.

The circuit 102 may be interfaced with a program memory 104 configured to provide storage of a set of computer executable instructions in the form of software, firmware, and/or hardware that at least partially provides functionality. Thus, the functionality described with respect to various software-based embodiments is also applicable to hardware-based embodiments, and conversely.

The interfaced program memory 104 and/or data memory 106 may be implemented as one of, or a combination of, volatile and non-volatile memory, such as random access memory ("RAM"), EEPROM, Flash memory, or the like. It is also within the purview of the present disclosure that either or both of the program memory 104 and data memory 106 may be included in the circuit 102 and/or the program memory 104 and data memory 106 may be provided together in a single memory source or may be provided together on multiple sources.

In some embodiments, the circuit 102 can be coupled to data memory 106. In some embodiments, data memory 106 can store data that is accumulated by the circuit 100, such as time and/or environmental condition data or a combination thereof (e.g., time-stamped environmental data). In some embodiments, this information can be provided to a database via a reader device (e.g., a remote reader device) that is not contained within the circuit 100 (e.g., a database on a server with a web portal for access by a number of clients).

Embodiments of the present disclosure can utilize memory compression techniques that allow a device to store more information. For example, a number of methods for memory compression associated with environmental sensing assemblies are described in U.S. Pat. No. 7,675,409, entitled "Environmental Sensing," to Thomas Jensen, et al. Such compression techniques are not described in more detail herein so as not to obscure embodiments of the present disclosure.

In some embodiments, the environmental sensing assembly 100 can include one or more environmental sensors 108 external to the circuit 102, which can perform environmental sensing in addition to or in lieu of that performed by the circuit 102 with the environmentally sensitive component 103. Data from the environmental sensors 108 can be input to the circuit 102. In at least one embodiment, the circuit 102 can use an input form the environmental sensor 102 to normalize data generated from the environmentally sensitive component 103.

In some embodiments, executable instructions can be provided that are executable by the circuit 102 to take an environmental measurement at a predetermined time interval. In various embodiments, executable instructions can be provided that are executable by the circuit 102 to take an average of a number of such environmental measurements. These averages can, for example, be calculated through use of a number of sets of environmental measurements. Such embodiments can be useful to help reduce power consumption by operation of one or more sensors and/or to help reduce consumption of available storage space in memory, among other benefits. The circuit 102 can further process the data and/or communicate the data to remote storage (e.g., a cloud database).

The circuit 102 can be coupled to a power source 122. In some embodiments that include the circuit 102 as a circuit 102, the power source 122 can be a printed battery. In some embodiments, the power source 122 can be an antenna, such as antenna 114 or a different antenna, configured to receive power from an external source via electromagnetic coupling. In at least one embodiment, the power source 122 can include both a battery and an antenna, where the battery is configured to provide power to the circuit 102 as needed when the external source is not available via electromagnetic coupling. The antenna can also be configured to function as a wireless communicator 112. For example, the antenna can communicate a change detected by the circuit 102 to an external source via electromagnetic coupling.

The circuit 102 can be coupled to a clock 110. It is also within the purview of the present disclosure that the clock 110 may be included in the circuit 102. The clock 110 can be used by the circuit to perform time measurement, among other functions.

The circuit 102 can be coupled to a wireless communicator 112. The wireless communicator 112 can include an infrared and/or radio frequency modulation circuit, in some embodiments.

The wireless communicator 112 can be coupled to an antenna 114. Some purposes of the hardware described herein, for example, can be to provide mechanisms for sensing environmental variables, performing storage of measured data, performing processing of the measured data (e.g., under embedded software control), communicating environmental data, providing display indications, and/or providing download and/or offload capability of processed data.

The circuit 102 can be coupled to one or more physical contact points 116. Physical contact points 116 can be suitable for contacting with an external probe device, for example a reader device, and can be located within the assembly or can be positioned for contact with or without penetration into the assembly, in various embodiments. The physical contact points 116 can be used for electrical communication between the circuit 100 and another device, such as a reader device. Examples of physical contact points include metal pins, pads, and the like. In some embodiments, one or more of the contact points 116 can be coupled to power source 122 to provide power to the power source 122 from, for example, a reader device. Such embodiments can be useful in recharging and/or supplementing the power source 122. At least one embodiment does not include the physical contact points 116.

The circuit 102 can be coupled to one or more indicators 118. For example, the indicators 118 can, in some embodiments, include a number of indicating Light Emitting Diodes (LEDs) that can be visible from an exterior of the circuit 100. At least one embodiment does not include the indicators 118.

Such indicators 118 can, for example, be arranged to indicate an upper, a middle, and a lower light as indicators 118. In such a configuration, the upper indicator can serve as an over limit status indicator, the lower indicator as an under limit status indicator, and the middle indicator can serve as an OK status indicator. As discussed herein, other types of display indicators 118 can be used in various embodiments and the indicators can be any suitable indicating mechanism.

Various embodiments can utilize a chemical change to provide a portion of or the entire indicator 118 functionality of the circuit 100. For example, an electro-chemical or ferrochemical component can be used to provide at least some indicator 118 functionality, in some embodiments.

The circuit 102 can be configured to initiate an alarm status when a predetermined alarm condition occurs based upon measured time and/or environmental data and/or an indication of a change in an environmental condition (measured using the environmentally sensitive component 103 and/or the environmental sensor 108). The alarm status, for example, can be signaled by indicators 118 (e.g., by illuminating, flashing, other otherwise operating LEDs, among other processes). Such an alarm condition can occur, for example, when environmental data exceeds a particular range (e.g., when a temperature rises above a certain threshold), among other alert events.

In some embodiments, an alarm status can be transmitted by wireless resonance from the circuit 102, wireless communicator 112, and/or by physical contact points 116 to another environmental sensing assembly and/or to a reader device. Whether transmitted by wireless communicator 112, physical contact points 116, or indicated by indicators 118, an alarm status can be beneficial in alerting users to particular environmental conditions that may require attention.

The circuit 102 can be coupled to an activation mechanism 120. Activation mechanism 120 can be provided by a number of possible circuits and constructions, including ones that include a breakaway tab switch, a pull-tab switch, an infrared switch, a magnetic switch, an electromagnetic switch, a radio frequency resonant switch, or a pushbutton momentary switch, among other mechanism types. For example, with respect to a pushbutton momentary switch or a pull-tab switch, activation can be accomplished by a user physically activating the circuit. In some embodiments, a transmitting device (e.g., wireless communicator 112) can be used to remotely accomplish the activation (e.g., by one or more radio frequency (RF) signals).

As stated above, the environmental sensing circuit 100 can include a power source 122 coupled to a number of components of the circuit 100, such as the circuit 102, environmental sensor 108, wireless communicator 112, physical contact points 116, and indicators 118, among others. In some embodiments, the power source 122 can be a coin-cell type power source. In some embodiments, the power source 122 can be a rechargeable battery power source. In at least one embodiment, the power source can be a printed battery.

Figure 2A:
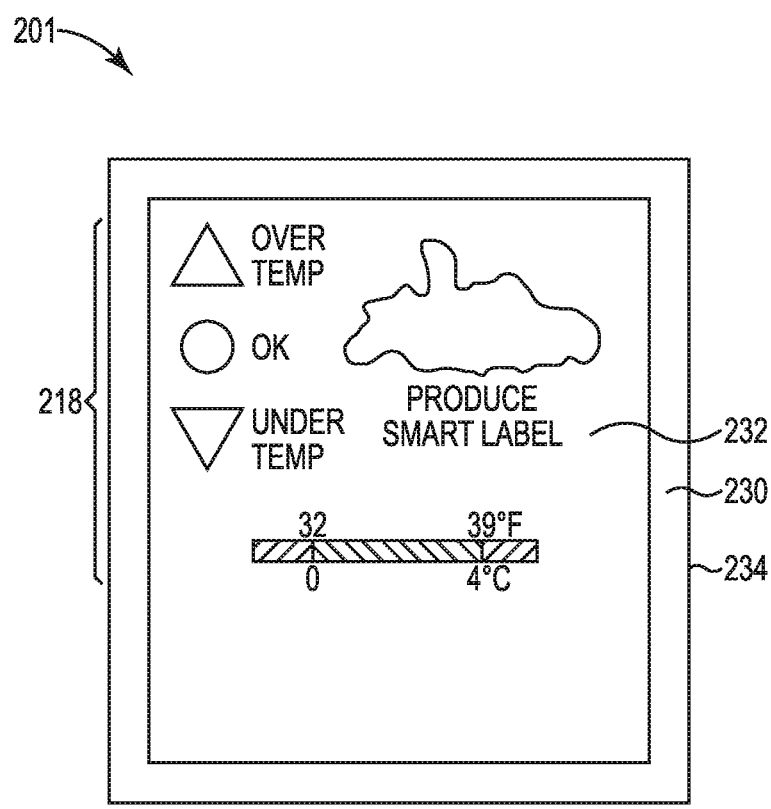
FIG. 2A is a top view of a labeled environmental sensing assembly according to one or more embodiments of the present disclosure.

FIG. 2A is a top view of a labeled environmental sensing assembly 201 according to one or more embodiments of the present disclosure. The labeled environmental sensing assembly 201 can include an environmental sensing assembly, which is analogous to the environmental sensing assembly 100 in FIGS. 1A and/or 1B. In some embodiments, the labeled environmental sensing assembly 201 and/or other circuits can include a protective cover 230 at least partially surrounding the assembly (e.g., including the environmental sensor, memory, wireless communicator, circuit, and/or power source, among other components).

In some embodiments, the cover 230 can be made larger such that it can be folded to cover both the front and the back of the labeled environmental sensing assembly 201. In various embodiments, an area of the cover 230 can be printed with legend information (e.g., text and/or symbols) and can include identifiers of what the one or more indicators 218 signify.

In some embodiments, a circuit and/or environmental sensing assembly (e.g., the circuit 102 and/or environmental sensing assembly 100 illustrated in FIGS. 1A-1B) can be made into a label, such as by sandwiching between a paper and/or plastic cover 230, and/or with an adhesive backing. In various embodiments, an area of the cover 230 can be printed with legend information such as text and/or symbols.

In some embodiments, a graphic label 232 can be constructed (e.g., from plastic and/or paper film, etc.). The label 232 can be fabricated from any suitable material including translucent or opaque materials and can be provided as a clear or semi-clear material with overprinting thereon, in some embodiments. In some embodiments, the graphic label 232 can include printed features on its surface.

Some embodiments utilize a transparent, semi-transparent, or opaque pouch 234 that forms an outer layer over the labeled environmental sensing assembly 201 (e.g., including the protective cover 230 and graphic label 232 if so equipped). The pouch 234 can be of any suitable material and can be sealed permanently or resealed in any suitable manner. The pouch 234 can be as small as or smaller than about 8.0 centimeters by 5.5 centimeters by 0.2 centimeters.

For instance the pouch 234 can be heat-sealed, glued, or have a physical sealing structure formed from the pouch material. Examples, of such materials include, but are not limited to materials including plastics, vinyls, polystyrenes, and other such materials. For instance, polyethylene terephthalate (PET) is one suitable plastic material for use with food.

Such pouches 234 can be designed to meet industry standards, such as food safety standards. As defined herein a food safety standard can be any standard created by an entity (e.g., the U.S. Food and Drug Administration) to regulate usage with food. In this way, if the pouch 234 is sealed, the pouch 234 may be approved for use (e.g., as safe for placement adjacent to food) while the contents do not have to be approved.

In some embodiments, the exterior of the pouch can meet such a requirement, while the interior may or may not meet a requirement. This case can save significant time and money since the manufacturer does not have to gain approval of the labeled environmental sensing assembly 201 to be placed within the pouch 234, in some instances, among other benefits.

In embodiments that utilize one or more illuminating indicators 218, such as LEDs, the indicators can illuminate printed lenses, for example, from behind or from the side. The legend information associated with the indicators (e.g., "over temp," "OK," "under temp" as illustrated in FIG. 2A), can be modified to suit programmed measurement and/or alert parameters. Other examples of the indicator 218 include electrochromic ink or other display types.

Embodiments can also include other graphic elements such as a logo, target product identification area, an activation break point graphic, and/or a temperature limit graphic, among others. The logo and target product identification area, as well as the temperature limit graphic can be used, for example, to supply a package, tag, or label with a unique graphic that is matched to the parameters that are programmed into a circuit's program memory and/or data memory.

In various embodiments, the tag or label device may also be inserted into a packaging material. Various packaging and manufacturing methods are described in more detail in U.S. Pat. No. 7,675,409, entitled "Environmental Sensing," by Thomas Jensen, et al.

Figure 2B:
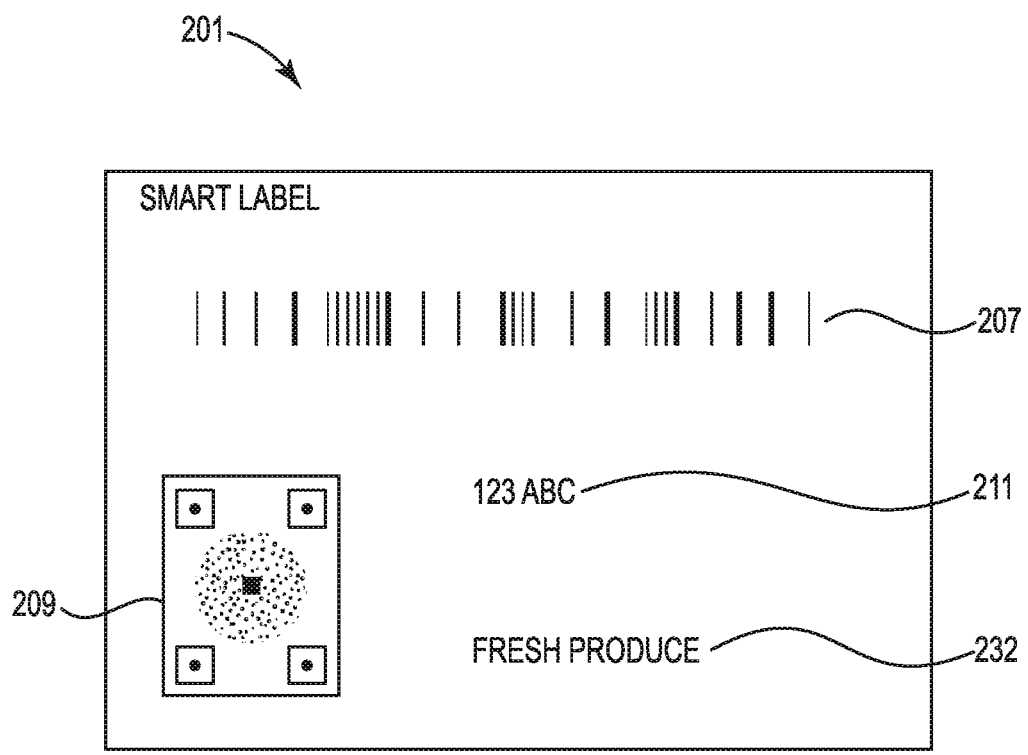
FIG. 2B is a top view of a labeled environmental sensing assembly according to one or more embodiments of the present disclosure.

FIG. 2B is a top view of a labeled environmental sensing assembly 201 according to one or more embodiments of the present disclosure. The labeled environmental sensing assembly 201 is largely analogous to that illustrated in FIG. 2B. The labeled environmental sensing assembly 201 can include a barcode 207, a QR code 209, an alphanumeric identifier 211, and a graphic and/or text label 232. The barcode 207, a QR code 209, an alphanumeric identifier 211, and a graphic and/or text label 232 can identify a product that is associated with or is to be associated with the labeled environmental sensing assembly 201.

In some embodiments, a display can be coupled to a circuit (e.g., of the assembly). For instance, as discussed further in connection with FIGS. 3A-3B, the display can be activated in response to a preset power sources within and/or coupled to the circuit reaching a threshold power level.

Figure 3A:
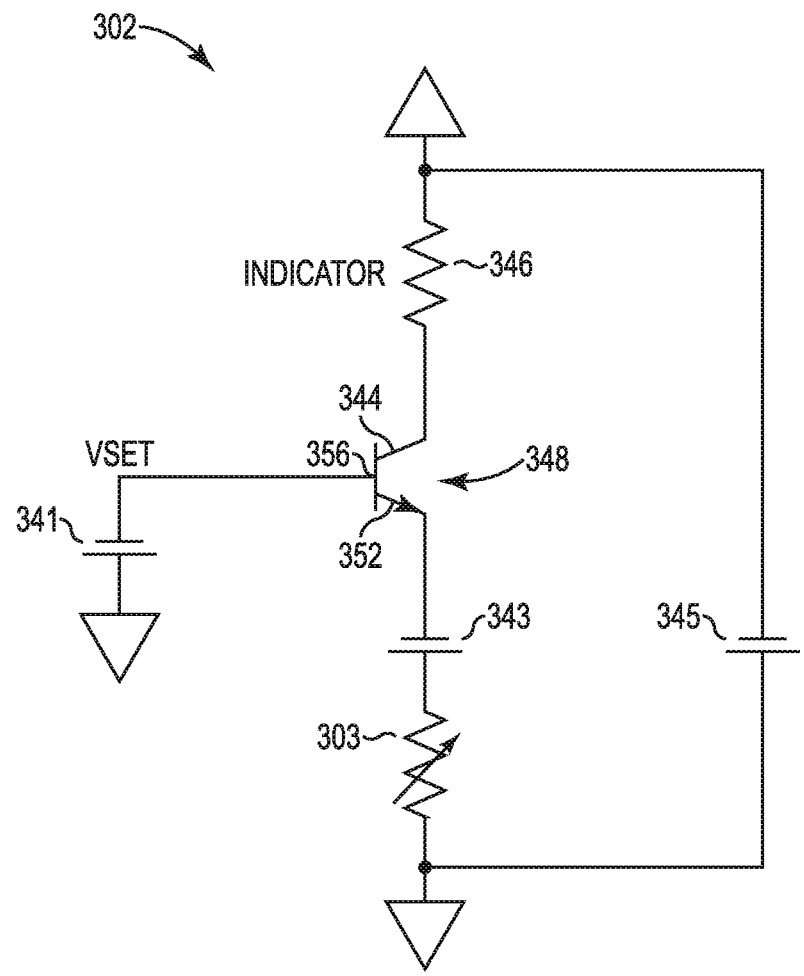
FIG. 3A is a block diagram of a circuit according to one or more embodiments of the present disclosure.

FIG. 3A is a block diagram of a circuit 302 according to one or more embodiments of the present disclosure. The circuit 302 is analogous to the circuit 102 illustrated in FIGS. 1A and/or 1B. The circuit 302 can be a printed circuit. The circuit 302 can be a portion of an environmental sensing assembly, such as the environmental sensing assembly 100 in FIGS. 1A and/or 1B. For example, although not specifically illustrated, the circuit 302 can be coupled to a memory that provides data storage. The circuit 302 can be coupled to a display. A display, as used herein, is an output surface and projecting mechanism that can be used to illustrate or illuminate text and/or graphic images. Example displays can include a liquid crystal display and/or a light-emitting diode. In some embodiments, the display can be the indicator 346 (described in more detail below) or be coupled to the indicator 346.

As illustrated by FIG. 3A, the circuit 302 can include and/or be coupled to a number of power sources 341, 343, 345. The power sources 341, 343, 345 can include batteries. For example, in some embodiments, the power sources 341, 343, 345 can be printed batteries or supercapacitors. The two power sources on the left side of the circuit (e.g., power sources 341, 343) can be power sources of a particular ratio to each other.

At least one power source 345 may be used to power the circuit 302. The power source 345 may be preset with an amount of power to provide energy to the circuit 302 for a particular period of time. This period of time may be the duration of a product shipment. In an embodiment where the power source 345 is a power source for the whole circuit 302, power source 341 and power source 343 can be capacitors with charge being delivered from power source 345.

At least one of the power sources can be a preset power source 341. The preset power source 341 can be preset with an amount of power (e.g., Vset) relative to the reference power source 343. The power source 341 can provide a reference and bias on a gate of the transistor 348. Both power source 341 and power source 343 may be of known electrical characteristics (e.g., internal resistance, capacitive leakage, and power decay). The particular amount of power built into power source 341 and power source 343 can be selected based on a product that the circuit 302 is to be and/or is applied to, and relative to an environmental condition to which the product may be exposed. The product can include a perishable product. For example, the particular amount of power can be associated with an amount of time and/or temperature for which the product is fresh and/or expected to fresh.

As illustrated by FIG. 3A, the circuit 302 can include a transistor. The transistor can be a bi-polar junction transistor (BJT) 348, such as an NPN transistor or a PNP transistor. A BJT includes three main terminal regions: a base 356, an emitter 352, and a collector 344. An NPN transistor comprises two semiconductor junctions that share a thin p-doped anode region, and a PNP transistor comprises two semiconductor junctions that share a thin n-doped cathode region. In typical operation, the base-emitter junction is forward biased, meaning that the p-doped side of the junction is more positive than the n-doped side, and the base-collector junction is reversed biased.

The preset power source 341 can be coupled to the base 356 of the BJT 348. When the preset power source 341 has power above a threshold power level, then the current entering the base 356 of the BJT 348 is amplified to produce a collector 344 and emitter 352 current. In such a state, the BJT 348 is in an active state and current flows between the collector 344 and emitter 352 of the BJT 348.

When the preset power source 341 depletes below a threshold power level, the current supplied by the preset power source 341 can be below a threshold current to keep the BJT 348 in an active state. When the BJT 348 is in an inactive state, the BJT 348 appears as an open circuit between the collector 344 and emitter 352 terminals.

Similarly, when the preset power source 343 depletes below power source 341 by a threshold power level, the current supplied by the power source 341 can bias the BJT 348 into an active state. When the BJT 348 is in an active state, current will flow through the collector 344 to the emitter 352 of the BJT 348.

As further illustrated by FIG. 3A, an indicator 346 (illustrated as a resistor) can be on the circuit 302 coupled to the collector 344 of the BJT 348. The indicator 346 can be an indicator such as a light source, electrochromic ink burst, a light emitting diode, etc. When the BJT 348 is in an inactive state, current does not flow across the indicator 346. When the BJT 348 is in an active state, current flows across the indicator 346, through the collector 344 and through the emitter 352. The flowing current can be sufficient to power an indicator (e.g., resister 346) and/or a display. Said differently, when in an active state, sufficient current flows across the BJT 348 to activate the indicator. In an inactive state, not enough current flows across the BJT 348 to activate the indicator. As further illustrated, an environmentally sensitive component 303 (illustrated as a variable resistor) can be on the circuit 302 coupled to the emitter 352 of the BJT 348. This environmentally sensitive component 303 may be a separate component or represent an internal resistance of the power source 343.

When the preset power source 343 reaches or goes below a threshold power level, an indicator (e.g., resistor 346) can be supplied sufficient current to activate. In at least one embodiment, the indicator 346 can be coupled to a display, and when activated, can active the display. An activated display can include a display that illustrates text and/or graphic images. For example, the activated display can illustrate a message that the product is not fresh and/or is spoiled. Prior to being activated, the display can be the same contrast as its surrounding.

Figure 3B:
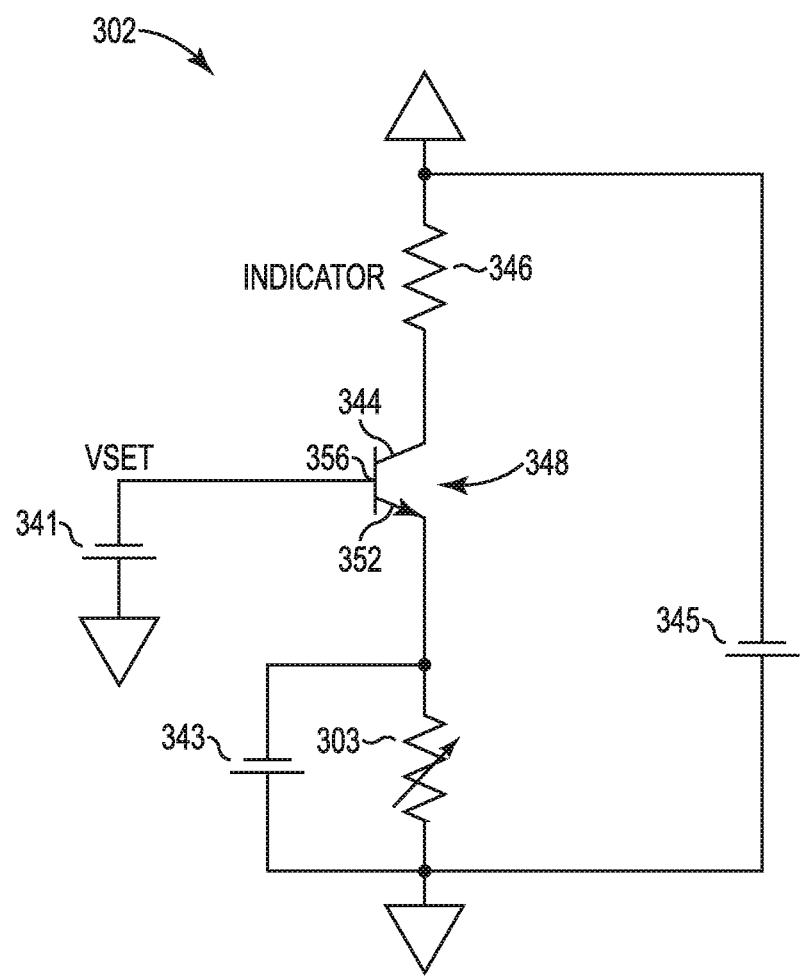
FIG. 3B is a block diagram of a circuit according to one or more embodiments of the present disclosure.

FIG. 3B is a block diagram of a circuit according to one or more embodiments of the present disclosure. FIG. 3B is largely analogous to FIG. 3A except that the power source 343 is in parallel with the environmentally sensitive component 303 rather than being in series therewith. The difference between the circuits illustrated in FIG. 3A and FIG. 3B is the difference between a "low-true" and a "high-true" triggered event. These are two embodiments for using the decay of the transistor base current to trigger an event on the transistor collector. These are configurations for an NPN transistor. Similar configurations for a PNP transistor where the collector actually feeds the transistor emitter side can be implemented by one of ordinary skill in the art. The total available voltage and output indicator can affect which circuit is more advantageous for a particular implementation.

The circuit 302 can be a printed circuit 302 that functions as a freshness indicator. The circuit 302 can include the environmentally sensitive component 303 coupled to a first power source 343. The circuit 302 can include a transistor 348 coupled to the first power source 343, to a second power source 341, and to the indicator 346. The circuit 302 can include a third power source 345 coupled between the environmentally sensitive component 303 and the indicator 346. The circuit 302 can be configured such that the third power source 345 provides overall power for the circuit 302, the second power source 341 provides a trickle charge for the circuit 302, the first power source 343 decays over time in relation to a characteristic of the environmentally sensitive component 303 that changes with a change in an environmental condition to which the environmentally sensitive component 303 is sensitive, and the third power source 345 provides power to the indicator 346 in response to the first power source decaying below a threshold power level.

In at least one embodiment, the transistor 348 can be a BJT where the second power source 341 is coupled to a base 356 of the BJT, the indicator 346 is coupled to one of a collector 344 and an emitter 352 of the BJT, and the environmentally sensitive component 303 is coupled to another of the collector 344 and the emitter 352 of the BJT.

In some embodiments, the first power source 343 and the environmentally sensitive component 303 can comprise a resistance-capacitance (RC) circuit. The environmentally sensitive component 303 can change a drain on the first power source 343 in response to the change in the environmental condition to which the environmentally sensitive component 303 is sensitive. As such, the RC circuit can be configured to mimic an Arrhenius equation. An Arrhenius equation can model the rate of spoilage of a product as temperature increases. To mirror the growth of pathogens, the rate of decay of the first power source 343 can correspond to $[f_{osc}=ne^{-(Ea/RT)}]$. This models the rate of reaction or Arrhenius Energy, where n is a constant, Ea is the activation energy, R is the universal gas constant, and T is the temperature in degrees Kelvin.

In some embodiments, the environmentally sensitive component 303 can be treated with a material by being coated with the material, doped with the material, etc. In at least one embodiment, the material can be a colloidal polymer. A particular colloidal polymer (or other material) can be chosen and/or doped to a known reaction with changes in the environmental condition (e.g., temperature). This known reaction can be selected in proportion to the Arrhenius equation described above for a particular product to be monitored by the freshness indicator. Changes in the environmental condition can cause different changes in a characteristic of the colloidal polymer, which can affect the electrical performance of the environmentally sensitive component 303 (e.g., the resistance thereof). As described herein, the change can affect a rate of decay of the first power source 343, which can change an amount of time that elapses before the indicator 346 is powered (e.g., activated). Activation of the indicator 346 can indicate possible spoilage of a product with which the circuit 302 (e.g., freshness indicator) is associated.

Figure 4A:
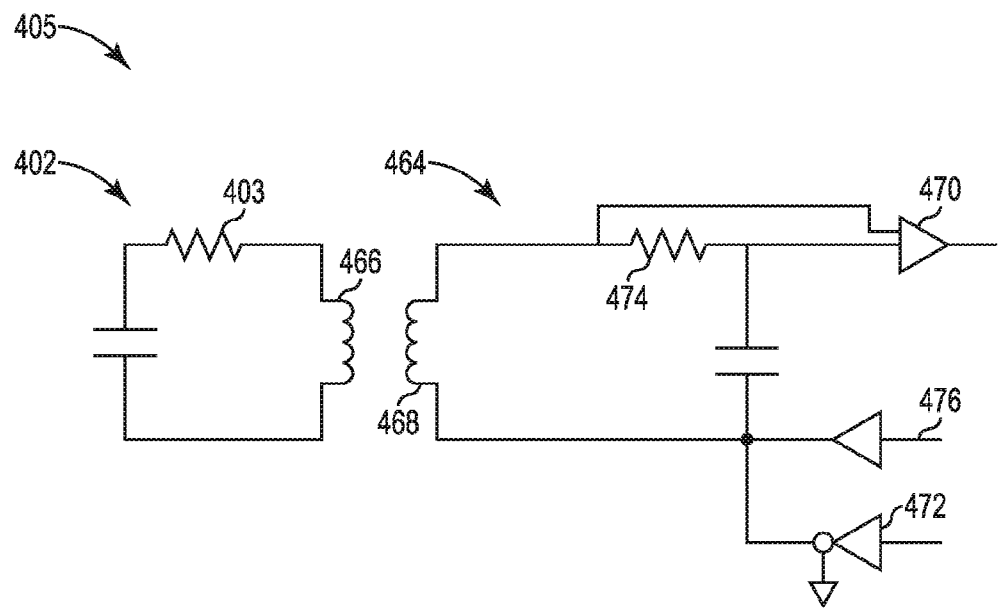
FIG. 4A is a block diagram of a sensing system according to one or more embodiments of the present disclosure.

FIG. 4A is a block diagram of a sensing system 405 according to one or more embodiments of the present disclosure. The sensing system can include a first circuit 402 that can be electromagnetically coupled (e.g., inductively coupled, capacitively coupled, coupled vie RF energy, etc.)

to a second circuit 464. The first circuit 402 can be placed on a product. The first circuit 402 is analogous to the circuit 102 illustrated in FIGS. 1A and/or 1B. The second circuit 464 can be located in proximity to the product (e.g., on a shelf that the product is and/or is to be located on, on a wall, floor, or ceiling of a container that the product is and/or is to be located in). In some embodiments, the first circuit 402 and/or the second circuit 464 is a printed circuit or at least a portion thereof is printed, such as containing printed components.

Figure 4B:
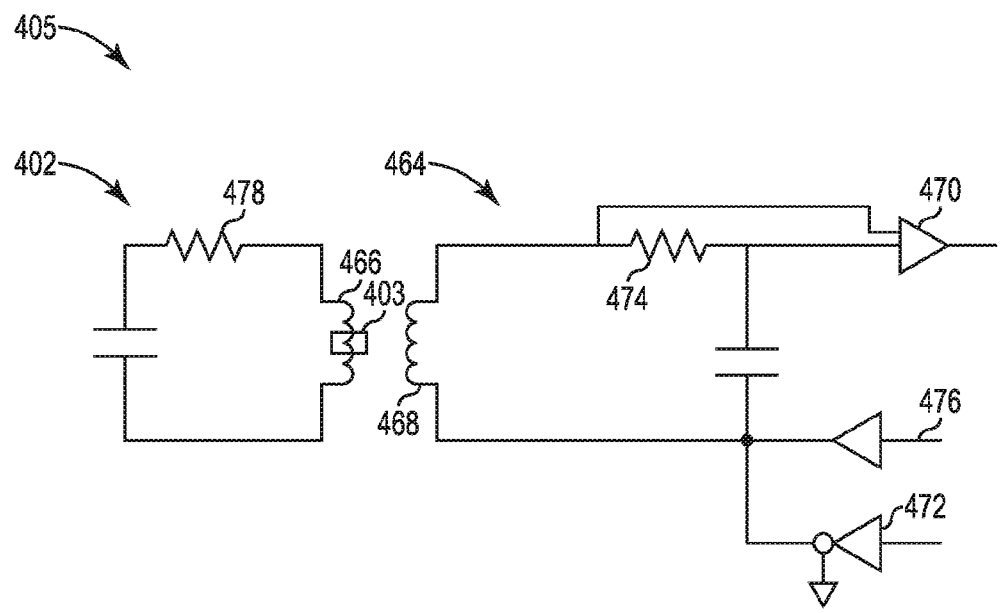
FIG. 4B is a block diagram of a sensing system according to one or more embodiments of the present disclosure.

As illustrated by FIGS. 4A-4B, the first circuit 402 can include an environmentally sensitive component 403. The environmentally sensitive component 403 is illustrated as a resistor in FIG. 4A, however embodiments are not so limited. Further, in some embodiments, the first circuit 402 can be a passive circuit. That is, the first circuit 402 may not include an internal power source or may include a boost power source, but not a primary power source.

The first circuit 402 can include an inductive component 466 and the second circuit 464 can include an inductive component 468. An inductive component, as used herein, is a component that makes use of a voltage that is generated when a field changes either on the same inductive component or a nearby inductive component. The inductive components 466, 468 can include inductive antennas (e.g. wires) as described in more detail with respect to FIGS. 5A-5D.

For instance, when the inductive components 466, 468 are proximal to one another, a signal 476 (e.g., power) from the second circuit 464 can be provided to the first circuit 402. A signal, as used herein, can include power (e.g., voltage times current), voltage, current, electric field, magnetic field, etc. Said differently, the second circuit 464 can power the first circuit 402 via electromagnetic coupling between the first circuit 402 and the second circuit 464. The power 476 can be provided periodically, such as once an hour, once a day, etc.

FIG. 4B is a block diagram of a sensing system 405 according to one or more embodiments of the present disclosure. The sensing system 405 illustrated in FIG. 4B is analogous to that illustrated in FIG. 4A, except that the environmentally sensitive component 403 is coupled directly to and/or integrated with the inductive component 466. In FIG. 4B, a resistor 478 (in place of the environmentally sensitive component 403 in FIG. 4A) is coupled to the inductive component 466. Examples of such an inductive component 466 coupled directly to an environmentally sensitive component are described in more detail with respect to FIGS. 5A-5D.

In at least one embodiment, a sensing system 405 can include a first circuit 402 on a product and a second circuit 464 in proximity to the product. The first circuit 402 includes an environmentally sensitive component 403. The second circuit 464 can be configured to periodically power the first circuit 402 via electromagnetic coupling between the first circuit 402 and the second circuit 464. The second circuit 464 can be configured to identify the product based on an attribute of the first circuit 402. The second circuit 464 can be configured to determine a change in an environmental condition based on a change in a characteristic of the environmentally sensitive component 403.

The second circuit 464 can be configured to determine the change in the environmental condition based on a variation of the electromagnetic coupling between the first circuit 402 and the second circuit 464 caused by the change in the characteristic of the environmentally sensitive component 403. For example, the environmentally sensitive component 403 can be doped with a material sensitive to the environmental condition, where an amount of dopant in the environmentally sensitive component 403 corresponds to the variation of the electromagnetic coupling. The variation of the electromagnetic coupling can be a variation in at least one of phase, frequency, and amplitude of a signal associated with the electromagnetic coupling as described below.

The sensing system 405 can function with different examples of environmentally sensitive components 403 and environmental conditions. Some examples include the environmentally sensitive component 403 being and/or being formed of a carbon nanotube thin film and the environmental condition being humidity. Other examples include the environmentally sensitive component 403 being and/or being formed of a semiconducting ink and the environmental condition being temperature. Other examples include the environmentally sensitive component 403 being and/or being formed of graphene and the environmental condition being humidity.

In some embodiments, the sensing system 405 can include a plurality of first circuits 402 each on a different product in proximity to the second circuit 464 and each having a different attribute. Each of the plurality of first circuits 402 can include a respective antenna having the different attribute as described in more detail with respect to FIGS. 5A-5D. In at least one embodiment, the different products can be serving utensils and/or a product container where the second circuit 464 is on a supporting structure and the environmental condition is temperature.

For example, the first circuits 402 can be in handles of the serving utensils and coupled to a temperature conducting core of the serving utensils. The different attributes can each be associated with a respective identifier for a substance into which a respective serving utensil is to be placed. For example, the sensing system 405 can function to identify a temperature of each product offered in a buffet by interaction of the first circuits 402 (in the serving utensils) and the second circuit 464 (e.g., in a frame, sneeze guard, etc. of the buffet).

As another example, the products can be serving and/or transport trays and the second circuit can be on a cart configured to transport the trays. For example, the sensing system 405 can function to identify a temperature of each tray in the cart, such as may be used with food service for catering, etc.

As an example, the product can be serving bowl and the second circuit can be in one of a light over the serving bowl, a frame of a serving area housing the serving bowl, and a sneeze guard for the serving bowl. For example, the sensing system 405 can function to identify a temperature associated with a substance in the serving bowl.

The environmentally sensitive component 403 can have different physical characteristics (e.g., electrical characteristics) for different first circuits 402. For example, the environmentally sensitive component 403 can be doped specifically and/or differently for different first circuits 402 that are to be used in association with different products. However, embodiments are not limited to doped environmentally sensitive components 403 and can include environmentally sensitive components 403 that have different physical properties that are differently sensitive to an environmental condition or change. Different doping of the environmentally sensitive component 403 can result in different components with different impedances. Different impedances in the first circuit 402, when inductively coupled to a same or similar second circuit 464 can result in different amounts of power being transferred from the second circuit 464 to the first circuit 402, or different efficiencies of power transfer from the second circuit 464 to the first circuit 402. The differences in the environmentally sensitive component 403 result in variations of the resonant frequencies of the second circuit 464 to the first circuit 402. The second circuit 464 can sense (e.g., via sense amplifier 470) an amount of power that is transferred or efficiency of power transferred and thereby determine an impedance of the environmentally sensitive component 403. This determination can be used to identify the product on which the first circuit 402 is placed. Upon powering the first circuit 402 by the second circuit 464, the amount of power that is transferred is dependent upon a relative value for the impedance of the environmentally sensitive component 403.

Similarly, the environmentally sensitive component 403 can be doped with a material sensitive to one or more particular environmental conditions. Examples of such environmental conditions include temperature and humidity. Variations in the environmental condition to which the environmentally sensitive component 403 is made sensitive can result in differences in the electrical behavior of the environmentally sensitive component 403, such as impedance, resistance, and/or capacitance. Different resistances in the first circuit 402, when inductively coupled to a same or similar second circuit 464 can result in different amounts of power being transferred from the second circuit 464 to the first circuit 402, or different efficiencies of power transfer from the second circuit 464 to the first circuit 402. The differences in the environmentally sensitive component 403 result in variations of the resonant frequencies of the second circuit 464 to the first circuit 402. The second circuit 464 can sense (e.g., via sense amplifier 470) an amount of power that is transferred or efficiency of power transferred and thereby determine a resistance of the environmentally sensitive component 403. This determination can be used to identify the product on which the first circuit 402 is placed. Upon powering the first circuit 402 by the second circuit 464, the amount of power that is transferred is dependent upon a relative value for the resistance of the environmentally sensitive component 403.

The sense amplifier 470 in the second circuit 464 can sense a difference between the input signal 476 and a signal across the resistor 474 in the second circuit 464. The input signal 476 can be a signal (e.g., power) associated with powering the first circuit 402. The signal across the resistor 474 can be proportional to the signal across the environmentally sensitive component 403. The difference between the input signal 476 and the signal across the resistor 474 can be indicative of how much power was transferred from the second circuit 464 to the first circuit 402. The input signal 476 can be controlled to ping periodically and/or on demand for the presence of a product associated with a first circuit 402. For example, where the second circuit 464 is embedded in a shelf, the input signal 476 can be triggered to determine if products are on the shelf, a quantity of products are on the shelf, and/or an identification of what products are on the shelf. Voltage dump 472 can be controlled to discharge the second circuit 464 (e.g., the capacitor illustrated therewith) before a subsequent ping. In some embodiments, the voltage dump 472 can be an open collector.

The second circuit 464 can sense the difference between the input signal 476 and the signal across the resistor 474 4 using the sense amplifier 470. A sense amplifier 470 can include an amplifier that outputs a signal (e.g., a voltage) that is proportional to a current flowing in a power rail. As illustrated by FIGS. 4A-4B, the sense amplifier 470 uses a current-sense resistor 474 to convert the load current in the power rail to a voltage which is then amplified by the sense amplifier 470. That is, the sense amplifier 470 can output a difference between the input signal 476 and the signal across the resister 474 in the second circuit 464 that is proportional to the signal across the environmentally sensitive component 403. The output can be an output signal indicating the difference.

In some embodiments, the second circuit 464 can identify the product to which the first circuit 402 is attached based on the difference between the input signal 476 and the signal across the resister 474. For example, the second circuit 464 can sense a difference between an input signal 476 and the signal across the current-sense resistor 474. Based on the difference, the second circuit 464 can identify the product. That is, the second circuit 464 can identify the product based on the output of the sense amplifier 470 (e.g., the difference output by the sense amplifier).

In some embodiments, the environmentally sensitive component 403 can be specifically doped to identify the product. For instance, the first circuit 402 attached to the product can include an environmentally sensitive component 403 that is doped to identify the product. A plurality of first circuits, in such embodiments, can exist with a variety of environmentally sensitive components.

For example, a plurality of first circuits can be created with different environmentally sensitive components. A first environmentally sensitive component can be doped to identify a first product, a second environmentally sensitive component can be doped to identify a second product, a third environmentally sensitive component can be doped to identify a third product, etc. The different components can be doped using different materials (e.g., chemicals and/or elements) and/or different amounts of dopants, for example.

The second circuit 464, in such embodiments, can identify the different products based on an output (e.g., a voltage output) of the sense amplifier 470 on the second circuit 464. Each voltage can vary, given the same input current, based on the different environmentally sensitive components.

In some embodiments, two or more of the plurality of first circuits 402 can be the same. That is, the environmentally sensitive components 403 of the two or more first circuits 402 can include a component doped using the same material and/or same amount of dopant to create a same resistance. In such embodiments, one or more pressure tabs can be located and/or associated with the second circuit 464. The second circuit 464 can differentiate between the products with the same first circuits based on the resonance frequency. For instance, the weight of the product can change the resonance frequency of the voltage. So long as the products have enough difference in weight, the pressure sensors can tell the products apart.

Further, in various embodiments, two or more second circuits 464 can exist in proximity to the first circuit(s) 402. The two or more second circuits 464 can be located in different locations and can be in communication. For example, the first circuit(s) 402 attached to a product(s) located on a shelf or container. The shelf can further include the two or more second circuits 464 that are located at different locations of the shelf or container, but each in proximity to the first circuit 402. In at least one embodiment, multiple second circuits 464 can be included in the sensing system 405. The multiple second circuits 464 can be in communication with each other and/or with a controller such that the second circuits 464 are configured to determine a relative location of the different products in a container or on a shelf. Such embodiment can be beneficial in assisting with inventory tracking and control. At least one embodiment includes multiple inductive components 468 multiplexed to one or more second circuits 464.

Each second circuit 464 can power the first circuit 402 using electromagnetic coupling. That is, each second circuit 464 can power the first circuit 402 and can sense a difference between the input signal 476 and the signal across the resistor 474. The sensed difference can be output as a signal (e.g., a voltage) by the sense amplifier 470. The power by the second circuits 464 can vary in time and/or with respect to distance to the first circuit 402. Using the output signal from the sense amplifier 470, the one or more second circuits can determine a location of the product (e.g., using time domain reflectometry, triangulation, etc.).

For example, the output signal by the sense amplifier 470 of two or more second circuits 464 can be different due to different distances of the first circuit 402 to each of the two or more second circuits 464. Based on the different output signals, a location of the first circuit 402 can be determined. A higher output signal from a sense amplifier 470 can indicate the first circuit 402 is closer to the source of the power (e.g., the particular second circuit 464) than a lower output signal from the sense amplifier 470. A higher output signal (voltage) can indicate a difference between the input signal 476 and a signal across the resister 474 is lower than a lower output signal. Thereby, a higher output signal by the sense amplifier 470 can indicate a greater power is transferred to the first circuit 402 than a lower output signal. The one or more second circuits 464 can communicate the information externally, such as to a computing device.

The second circuits 464 can be located on a shelf of a grocery store and a variety of products can be placed on the shelf. The two or more second circuits 464 can be used to map locations of the variety of products on the shelf, as well as, identify the number and identification of the variety of products. Using such information, the grocery store can identify current stock on the shelf and potential issues with the stock (low inventory, products out of place, and/or other issues with the products). The second circuits 464 can communicate the information to a computing device managed by the grocery store. The computing device may provide a display of the information received and/or send an alert to a user in response to an issue.

Other embodiments can include an environmental sensing system. The environmental sensing system can include a first circuit placed on a serving utensil. Example serving utensils can include a spoon, a spatula, etc. The serving utensil can be metal, for example. A second circuit can be placed in a product container and/or in proximity to the first circuit. Example product containers can include a serving/food container, a bowl, a plate, etc.

Although not specifically illustrated, in some embodiments, the first circuit 402 and/or the second circuit 464 can include a memory and/or a power source, such as a battery. For example, the first circuit 402 can include the environmental sensing circuit 100 discussed with respect to FIGS. 1A and/or 1B. The first circuit 402 can measure environmental data, such as temperature, and may store the environmental data on the memory coupled to the first circuit 402, or relate the environmental information to the second circuit 464 when interrogated by the second circuit 464. The second circuit 464 logic can periodically communicate with the first circuit 402 to receive the environmental data. The first circuit 402 can send the environmental data measured from the time of the last communication. In such embodiments, the second circuit 464 can comprise a reader device, as discussed with respect to FIGS. 1A-1B.

Alternatively, the first circuit 402 can be a passive circuit. The second circuit 464 can periodically provide power via electromagnetic coupling and/or radiation to the first circuit 402. In response to the power, the first circuit 402 can measure a temperature and communicate the temperature to the second circuit 464.

In some embodiments, one or more environmental sensing assemblies, such as the environmental sensing circuit 100 discussed in connection with FIGS. 1A and/or 1B, can be located on a transportation vehicle (e.g., a truck). The transportation vehicle can transport a variety of products, some or all of which can include an environmental sensing assembly, to a location. For example, the transportation vehicle can transport the products from a producer to a distribution warehouse and/or final sales location.

The transportation vehicle can include a reader device. The reader device can include an electronic device that can wirelessly communicate with other devices. The reader device can communicate with the one or more environmental sensing assemblies wirelessly, for example. In some embodiments, cases, pallets, or the transportation vehicle can be outfitted with one or more antennas for communicating with a reader system. These antennas may be of varying sizes and placed individually or in multiples upon a surface. For example, and array of antennas may be printed on a small sheet of paper or plastic attached to a case, or on a slip-sheet used with a pallet, or a large sheet of paper or plastic on a side of the transportation vehicle, or built into one or more walls or floor of a transportation vehicle.

Additionally, when the transportation vehicle goes through gateways of a geo-fencing system, environmental data from the one or more environmental sensing assemblies can be transferred through the geo-fencing system and sent to a database using a server and the reader device.

A geo-fencing system, as used herein, is a system that uses global positioning systems (GPS) or radio frequency identification (RFID) to define geographical boundaries and includes a trigger so that when a device enters and/or exists a gateway (e.g., a boundary), data is sent from the device to a database. For example, gateways can be present throughout a highway or railway to track the location of trucks and/or rail cars.

The database can communicate the environmental data to the customer, such as via a customer database. The customer database can accessible by the customer to view the environmental data and/or can send an alert in response to the environmental data. That is, the environmental data can be accessed by a user and/or other person associated with the products without additional human interaction to measure the environmental data and send the data from the transportation vehicle to the user. The geo-fencing system already takes measurements from the transportation vehicle as the transportation vehicle drive through the gateways.

An alert can be sent to the user (e.g., a shipper and/or the receiver), in various embodiments. For example, the receiver can reject a shipment prior to the shipment arriving in response to the alert. This can prevent an insurance claim for the receiver, lowering the insurance cost over time. Further, the shipper may have lower transportation cost as the transportation vehicle does not have to continue to the location of the receiver for a rejected shipment.

Figure 5A:
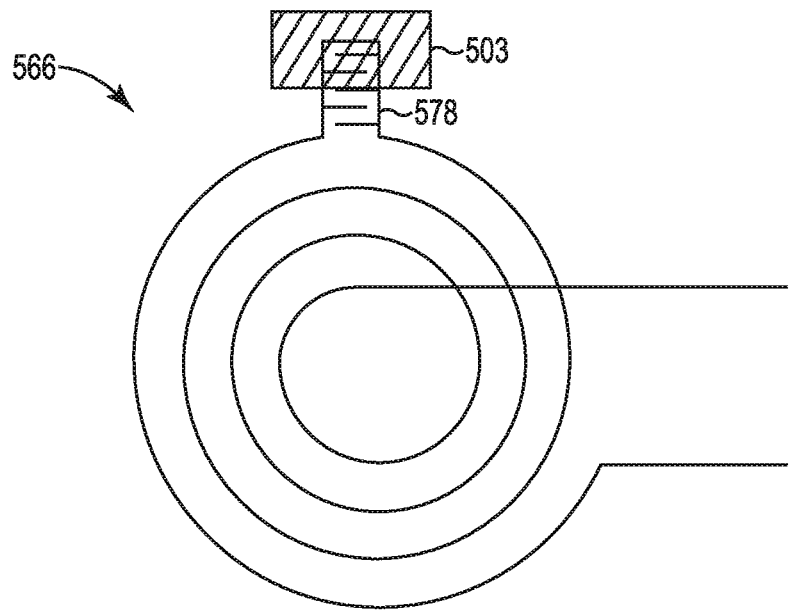
FIG. 5A is a block diagram of a sensing system antenna according to one or more embodiments of the present disclosure.
Figure 5B:
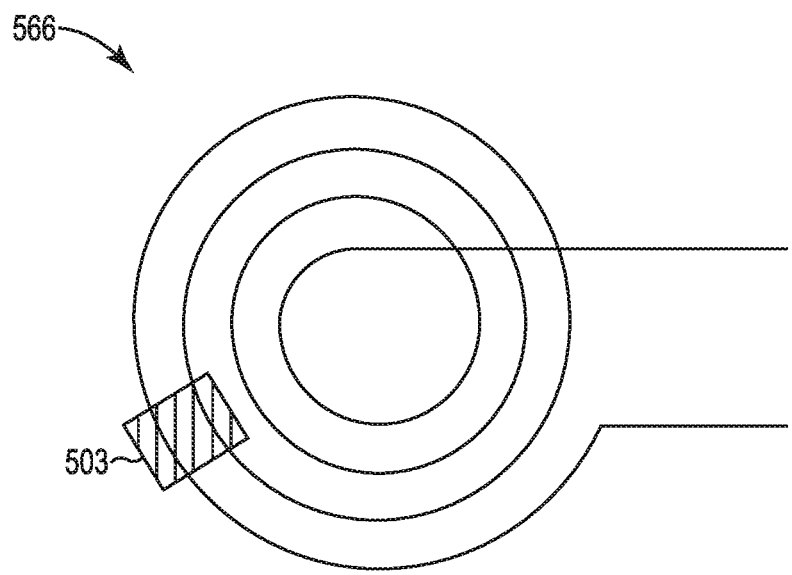
FIG. 5B is a block diagram of a sensing system antenna according to one or more embodiments of the present disclosure.
Figure 5C:
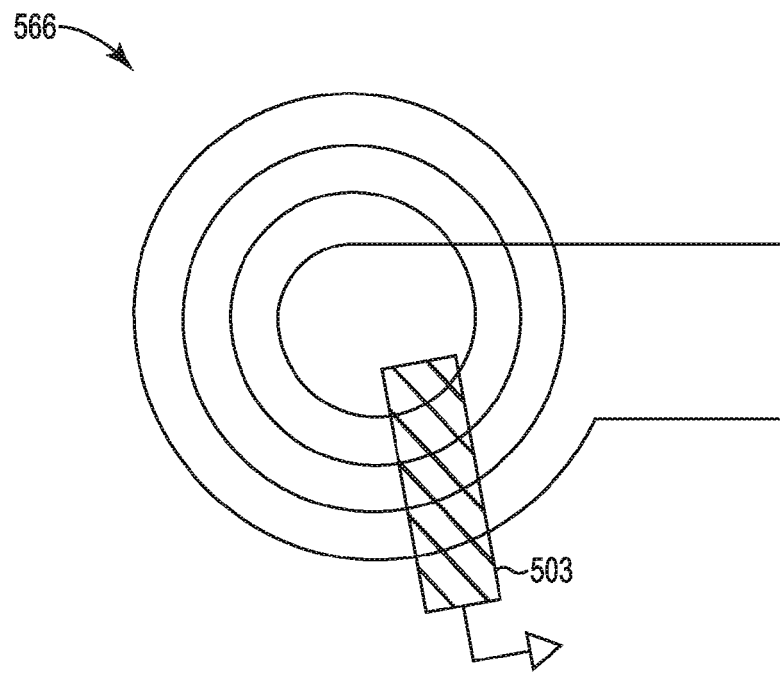
FIG. 5C is a block diagram of a sensing system antenna according to one or more embodiments of the present disclosure.
Figure 5D:
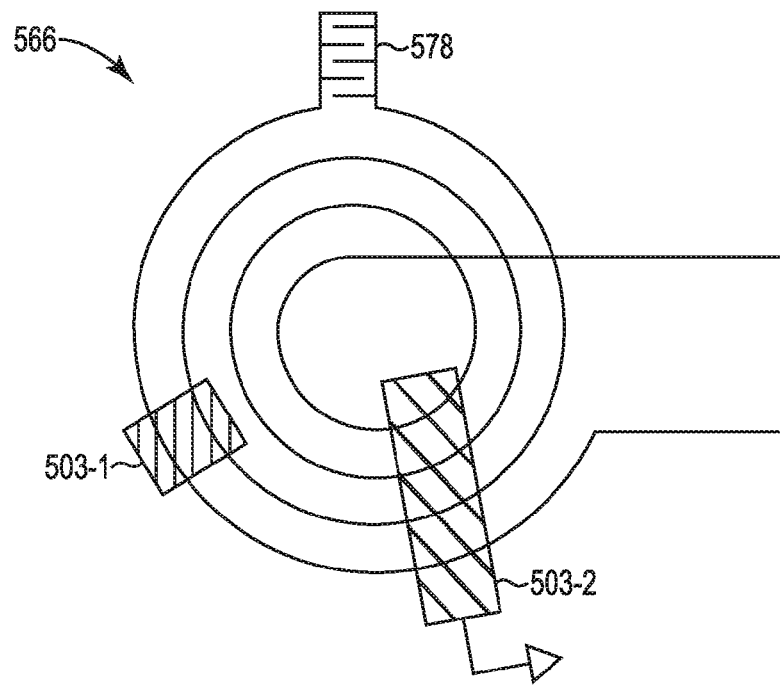
FIG. 5D is a block diagram of a sensing system antenna according to one or more embodiments of the present disclosure.

FIGS. 5A-5D are block diagrams of an antenna 566 according to one or more embodiments of the present disclosure. The antenna 566 is analogous to the 466 illustrated in FIG. 4B. As described above, some embodiments include a plurality of different first circuits (e.g., first circuit 402 illustrated in FIG. 4B), where each of the first circuits can include a respective antenna 566 having a different attribute. The attribute can be a physical attribute, such as a Q factor of the antenna 566. Antennas 566 having different Q factors can have different electrical properties that can be detected via electromagnetic coupling as described above. The physical attribute can be a notch 578 or impurity in the antenna 566, as illustrated in FIGS. 5A and 5D. Different notches 578 and/or impurities in different antennas 566 can provide different attributes (e.g., electrical properties) of the antennas 566 that can be detected via electromagnetic coupling as described above. This can allow the second circuit (e.g., second circuit 464 illustrated in FIGS. 4A-4B) to identify different products that have different first circuits thereon via electromagnetic coupling therewith.

In some embodiments, the environmentally sensitive component 503 can be integrated into the antenna 566, as illustrated in FIGS. 5A-5D. In FIG. 5A, the environmentally sensitive component 503 is integrated with the notch 578 or impurity such that the physical attribute (notch or impurity) of different antennas 566 can be used not only for identification of a product, but also for determination of a change in the environmental condition as described herein.

In FIG. 5B, the environmentally sensitive component 503 is illustrated as being in contact with the antenna 566 such that the change in the environmental condition causes a change in the inductance of the antenna 566. A change in inductance of the antenna 566 can cause a change in a Q factor of the antenna 566, which can cause a change in a resonant frequency of the antenna 566. This can allow the second circuit to determine the change in the environmental condition by determining a changed response of the antenna 566 caused by the change in inductance via electromagnetic coupling with the antenna 566.

In FIG. 5C, the environmentally sensitive component 503 is illustrated as being insulated from the antenna 566 such that the change in the environmental condition causes a change in a reference plane (e.g., ground plane or power plane) of the antenna 566. This can allow the second circuit to determine the change in the environmental condition by determining a changed response of the antenna 566 caused by the change in the reference plane via electromagnetic coupling with the antenna 566.

FIG. 5D illustrates an antenna 566 that includes a notch 578 or impurity, a first environmentally sensitive component 503-1 in contact with the antenna 566, and a second environmentally sensitive component 503-2 insulated from the antenna 566. A sensing system can include multiple such antennas 566 for different products such that different notches 578 or impurities can be used to identify the different products. Furthermore, each different antenna 566 can be used to determine a change in two different environmental conditions, where the first environmentally sensitive component 503-1 is sensitive to a first environmental condition and the second environmentally sensitive component 503-2 is sensitive to a second (different) environmental condition. Embodiments are not limited to antennas including one or two different environmentally sensitive components 503 as more or fewer can be included.

Although not specifically illustrated, some embodiments can include a sensing system that includes a plurality of different antennas 566 on a first circuit that each has a different environmentally sensitive component 503 that is sensitive to a different environmental condition. Such a circuit could function similarly to that illustrated in FIG. 5D, except that different antennas for the different environmentally sensitive components 503 are included. The second circuit can determine a change the in the different environmental conditions via electromagnetic coupling with the different antennas. At least one embodiment includes the different antennas as a sub-antenna within a larger antenna (e.g., a coil within a coil).

In some embodiments, the characteristic of the antenna 566 can be a harmonic of the antenna 566. For example, one antenna 566 can have separate harmonics for different functions. A first harmonic can be associated with identification of the product and a second harmonic can be associated with the environmentally sensitive component 503. That is, via electromagnetic coupling, the second circuit can use the different harmonics to separately identify the product and determine the change in environmental condition. As an example, a main carrier can be associated with product identification and a sub-carrier response can be associated with determination of the change in environmental condition (or vice versa). As another example, a main band can be associated with product identification and a sideband can be associated with determination of the change in environmental condition (or vice versa). Similarly, the presence or absence of a sideband or lobe or a magnitude of a sideband or lobe can be used to communicate the product identification and/or change in environmental condition.

In all cases above, coupling and/or communication can take many forms along the electromagnetic spectrum including radiation, light, and magnetism. As such, the communication point may take the form of an antenna, antenna, LED, photodetector, etc.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the disclosure. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the disclosure includes various other applications in which the above structures and methods are used. Therefore, the scope of various embodiments of the disclosure should be determined with reference to the appended claims, along with the full range of equivalents to which such claims are entitled.

Additionally, in reading this disclosure and claims, it should be noted that the indefinite article "a" or "an", as it is used herein, is not intended to limit the number of elements to one. Accordingly, the terms "a" and "an" should be viewed as meaning one or more unless such limitation is expressly stated or such meaning would be illogical based upon the arrangement of elements formed by such meaning. Further, the term "a number of" should be interpreted as meaning one or more.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed:

1. An electronic indicator, comprising:
a circuit including:
an environmentally sensitive component having a sensing component treated with or containing a material so as to be sensitive to an environmental condition;
wherein the material is reactive with an environment to cause a change in a characteristic of the environmentally sensitive component;
wherein the circuit is configured to detect the change; and
wherein the circuit is configured to communicate the change;
a first power source configured to decay over a predetermined period corresponding to the characteristic of the environmentally sensitive component;
a second power source configured to provide a reference and bias on at least one of: (i) a gate of a transistor and (ii) a base of a transistor;
a third power source configured to provide overall power for the circuit; and
an indicator configured to activate in response to a threshold current being applied to the indicator;
wherein, in response to the first power source falling below a threshold power level, the threshold current is applied to the indicator; and
a display configured to activate in response to the indicator activating,
wherein the display is coupled to the indicator.

2. The electronic indicator of claim 1, wherein the characteristic of the environmentally sensitive component includes at least one of a Q factor, an impedance, a resistance, a capacitance, an inductance, a capacitive leakage, and a power decay.

3. The electronic indicator of claim 1, wherein the material includes at least one of a carbon nanotube collection, a semiconducting ink, and an organic thin film.

4. The electronic indicator of claim 1, wherein the environmental condition includes at least one of a temperature, a humidity, and a presence of a chemical and the environmentally sensitive component includes at least one of an electrode, a resistor, and a transistor.

5. The electronic indicator of claim 1, wherein the environmentally sensitive component is coated with the material.

6. The electronic indicator of claim 1, wherein the environmentally sensitive component is doped with the material.

7. The electronic indicator of claim 1, further comprising a printed battery coupled to the circuit.

8. An electronic indicator, comprising:
a circuit including:
an environmentally sensitive component having a sensing component doped with a material so as to be sensitive to an environmental condition;
wherein the material is reactive with an environment to cause a change in a characteristic of the environmentally sensitive component;
wherein the circuit is configured to detect the change; and
wherein the circuit is configured to communicate the change;
a first power source configured to decay over a predetermined period corresponding to the characteristic of the environmentally sensitive component;
a second power source configured to provide a reference and bias on at least one of: (i) a gate of a transistor and (ii) a base of a transistor;
a third power source configured to provide overall power for the circuit; and
an indicator configured to activate in response to a threshold current being applied to the indicator;
wherein, in response to the first power source falling below a threshold power level, the threshold current is applied to the indicator; and
a display configured to activate in response to the indicator activating,
wherein the display is coupled to the indicator.

9. The electronic indicator of claim 8, wherein the characteristic of the environmentally sensitive component includes at least one of a Q factor, an impedance, a resistance, a capacitance, an inductance, a capacitive leakage, and a power decay.

10. The electronic indicator of claim 8, wherein the material includes a colloidal polymer.

11. The electronic indicator of claim 8, wherein the material includes at least one of a carbon nanotube collection, a semiconducting ink, and an organic thin film.

12. The electronic indicator of claim 8, wherein the environmental condition includes at least one of a temperature, a humidity, and a presence of a chemical and the environmentally sensitive component includes at least one of an electrode, a resistor, and a transistor.

13. The electronic indicator of claim 8, further comprising a printed battery coupled to the circuit.

* * * * *